United States Patent
Stanhope

(10) Patent No.: US 11,690,308 B2
(45) Date of Patent: Jul. 4, 2023

(54) SYSTEM AND METHOD FOR CONTROLLING THE OPERATION OF AN AGRICULTURAL IMPLEMENT BEING TOWED BY A WORK VEHICLE

(71) Applicant: CNH Industrial America LLC, New Holland, PA (US)

(72) Inventor: Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 942 days.

(21) Appl. No.: 15/978,456

(22) Filed: May 14, 2018

(65) Prior Publication Data

US 2019/0343032 A1    Nov. 14, 2019

(51) Int. Cl.
    *A01B 79/00*     (2006.01)
    *A01B 63/00*     (2006.01)
    *A01B 76/00*     (2006.01)

(52) U.S. Cl.
    CPC .......... *A01B 79/005* (2013.01); *A01B 63/002* (2013.01); *A01B 76/00* (2013.01)

(58) Field of Classification Search
    CPC ...... A01B 63/002; A01B 76/00; A01B 79/005
    See application file for complete search history.

(56) References Cited

U.S. PATENT DOCUMENTS

| | | | | |
|---|---|---|---|---|
| 5,190,111 A * | 3/1993 | Young et al. | ........ | A01B 63/112 172/7 |
| 5,992,533 A * | 11/1999 | Scarlett et al. | ...... | A01B 79/005 172/4 |
| 6,292,729 B2 * | 9/2001 | Falck | ..................... | A01B 63/00 172/2 |
| 6,581,695 B2 * | 6/2003 | Bernhardt | ............ | A01B 59/068 172/439 |
| 6,688,403 B2 * | 2/2004 | Bernhardt | ............ | A01B 69/004 172/2 |
| 7,054,731 B1 * | 5/2006 | Lange | .................. | A01B 69/008 172/4.5 |
| 7,162,348 B2 * | 1/2007 | McClure | .............. | A01B 69/004 280/456.1 |
| 7,490,678 B2 * | 2/2009 | Unruh | .................. | A01B 69/004 172/2 |
| 7,904,226 B2 * | 3/2011 | Dix | ...................... | A01B 69/004 701/50 |

(Continued)

*Primary Examiner* — Thomas B Will
*Assistant Examiner* — Joel F. Mitchell
(74) *Attorney, Agent, or Firm* — Rickard DeMille; Rebecca Henkel

(57) ABSTRACT

In one aspect, a system for controlling an operation of agricultural implements may include a work vehicle configured to tow an implement. The work vehicle may include a hitch assembly having a draw point configured to be coupled to the implement. The work vehicle may further include an actuator configured to move the draw point relative to the hitch frame to adjust the position of the implement relative to the work vehicle. The implement may include a sensor configured to detect an operational parameter indicative of the operation of the implement. Additionally, the implement may further include a controller communicatively coupled to the sensor, with the controller being configured to initiate control of an operation of the actuator based on sensor data received from the sensor to adjust the operational parameter of the implement.

16 Claims, 4 Drawing Sheets

(56) References Cited

U.S. PATENT DOCUMENTS

| | | | | |
|---|---|---|---|---|
| 8,649,930 B2* | 2/2014 | Reeve et al. | ......... | A01B 69/008 |
| | | | | 701/472 |
| 9,232,688 B2* | 1/2016 | Kormann et al. | ... | A01B 69/005 |
| 9,709,969 B2* | 7/2017 | Anderson | ............ | G05D 1/0295 |
| 10,123,472 B1* | 11/2018 | Schneider | ............ | B62D 15/025 |

* cited by examiner

SYSTEM AND METHOD FOR CONTROLLING THE OPERATION OF AN AGRICULTURAL IMPLEMENT BEING TOWED BY A WORK VEHICLE

FIELD

The present disclosure generally relates to agricultural implements and, more particularly, to systems and methods for controlling the operation of an agricultural implement being towed by a work vehicle via an associated hitch assembly.

BACKGROUND

Agricultural implements, such as cultivators, pull-type sprayers, nutrient applicators, and/or the like, are configured to be towed across a field by a suitable work vehicle, such as an agricultural tractor. While traversing the field, the implement is configured to perform one or more operations on the field, such as cultivating the soil and/or applying pesticides, nutrients, and/or other agricultural substances. In many instances, to maintain the desired precision of the operation(s) being performed by the implement, it is necessary to adjust one or more operational parameters of the implement while the implement is being towed across the field. In this regard, the implement generally includes one or more hydraulic cylinders and associated hydraulic components (e.g., pressure-regulating valves) that are configured to adjust the operational parameter(s) of the implement, such as the down force or pressure being applied onto one or more ground-engaging tools of the implement. However, such hydraulic components increase the overall cost, complexity, and maintenance requirements of the implement.

Accordingly, an improved system and method for controlling the operation of an agricultural implement being towed by a work vehicle would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling an operation of agricultural implements. The system may include a work vehicle configured to tow an implement. The work vehicle may include a hitch assembly having a hitch frame and a draw point moveable relative to the hitch frame, with the draw point configured to be coupled to the implement. The work vehicle may further include an actuator configured to move the draw point relative to the hitch frame to adjust the position of the implement relative to the work vehicle. The implement may include a sensor configured to detect an operational parameter indicative of the operation of the implement. Additionally, the implement may further include a controller communicatively coupled to the sensor, with the controller being configured to initiate control of an operation of the actuator based on sensor data received from the sensor to adjust the operational parameter of the implement.

In another aspect, the present subject matter may be directed to a method for controlling an operation of an agricultural implement being towed by a work vehicle. The work vehicle may include a hitch assembly including a hitch frame and a draw point moveable relative to the hitch frame, with the draw point configured to be coupled to the implement. The work vehicle may further include an actuator configured to move the draw point relative to the hitch frame to adjust the position of the implement relative to the work vehicle. The method may include monitoring, with a computing device installed on the implement, an operational parameter indicative of the operation of the implement. The method may also include comparing, with the computing device, the monitored operational parameter to at least one threshold parameter range. Furthermore, when the monitored operational parameter exceeds or falls below the least one threshold parameter value, the method may include, initiating, with the computing device, control of an operation of the actuator to adjust the operational parameter of the implement.

In a further aspect, the present subject matter may be directed to a controller including one or more processors and one or more memory devices. The one or more memory devices may be configured to store computer-readable instructions that, when implemented by the one or more processors, configure the controller to monitor an operational parameter indicative of an operation of an agricultural implement. The controller may also be configured to compare the monitored operational parameter to at least one threshold parameter value. Furthermore, when the monitored operational parameter exceeds or falls below the least one threshold parameter value, the controller may be configured to initiate control of an operation of an actuator to adjust the operational parameter of the implement.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
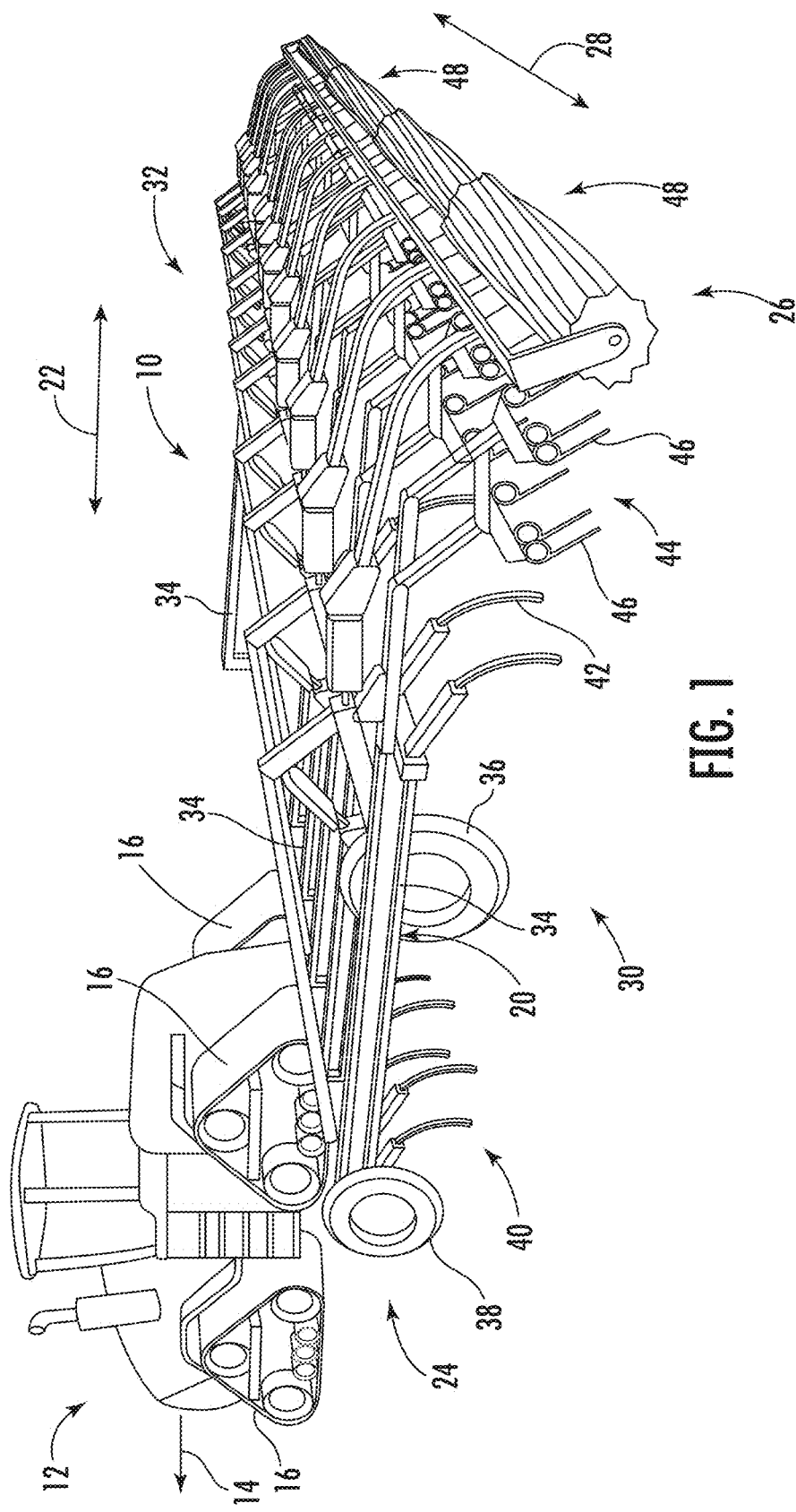
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of an agricultural implement being towed by a work vehicle across a field. In several embodiments, the implement may include a sensor coupled thereto that is configured to detect an operational parameter indicative of the operation of the implement. A controller of the implement may then be configured to initiate control of the operation of an actuator associated with a hitch assembly of the work vehicle based on data received from the sensor to allow the monitored operational parameter of the implement. For instance, upon receipt of the data from the sensor, the implement-based controller may be configured to transmit signals to a controller(s) of the work vehicle (e.g., via ISOBUS Class 3 communications protocols (ISO 11783-9)) requesting the vehicle-based controller(s) to adjust the operation of the hitch actuator (e.g., by controlling the operation of an associated valve configured to supply hydraulic fluid to the actuator). As such, based on the request from the implement-based controller, the vehicle-based controller may adjust the orientation or position of the implement relative to the vehicle in a manner that adjusts or varies the operation of the implement.

In accordance with aspects of the present subject matter, the disclosed system may be configured to regulate an orientation of the implement relative to the work vehicle. For example, in several embodiments, the vehicle's hitch assembly may include a draw point configured to be coupled to the implement, with the draw point being moveable relative to an associated hitch frame. In this regard, a hitch actuator may be configured to adjust the position of the draw point relative to the hitch frame. In such embodiments, the operational parameter detected by the sensor coupled to or otherwise supported by the implement may be indicative of an orientation of the implement. As such, the implement-based controller may be configured to compare the detected operational parameter to a threshold parameter value(s). When the operational parameter exceeds or falls below the threshold parameter value(s), the implement-based controller may be configured to initiate control of the hitch actuator such that orientation of the implement is adjusted. For example, in one embodiment, the actuator may be configured to adjust the position of the draw point relative to the hitch frame along a lateral direction of the work vehicle and the implement to effectuate a change in the orientation of the implement.

Referring now to the drawings, FIG. 1 illustrates a perspective view of one embodiment of an agricultural implement 10 coupled to a work vehicle 12. In general, the implement 10 may be configured to be towed across a field along a direction of travel 14 by the work vehicle 12. As shown, the work vehicle 12 may be configured as an agricultural tractor having a plurality of track assemblies 16 for use in traversing the field. It should be appreciated, however, that the work vehicle 12 may be configured as any suitable work vehicle, such as a wheeled vehicle. As will be described below, a hitch assembly 18 (FIG. 2) of the work vehicle 12 may be configured to be coupled to the implement 10.

In several embodiments, the implement 10 may include an implement frame 20. As shown, the frame 20 may extend along a longitudinal direction 22 between a forward end 24 and an aft end 26. The frame 20 may also extend along a lateral direction 28 between a first side 30 and a second side 32. In this respect, the frame 20 generally includes a plurality of structural frame members 34, such as beams, bars, and/or the like, configured to support or couple to a plurality of components. Additionally, a plurality of wheels may be coupled to the frame 20, such as a set of centrally located wheels 36 (one is shown) and a set of front pivoting wheels 38 (one is shown), to facilitate towing the implement 10 in the direction of travel 14.

In one embodiment, the frame 20 may be configured to support a cultivator 40, which may be configured to till or otherwise break the soil over which the implement 10 travels to create a seedbed. In this respect, the cultivator 40 may include a plurality of ground engaging tools 42, which are pulled through the soil as the implement 10 moves across the field in the direction of travel 14. The ground engaging tools 42 may be configured to be pivotally mounted to the frame 20 to allow the ground engaging tools 42 pivot out of the way of rocks or other impediments in the soil.

Moreover, as shown in FIG. 1, the implement 10 may also include one or more harrows 44. As is generally understood, the harrows 44 may be configured to be pivotally coupled to the frame 20. The harrows 44 may include a plurality of ground engaging elements 46, such as tines or discs, which are configured to level or otherwise condition any ridges in the soil created by the cultivator 40. Specifically, the ground engaging elements 46 may be configured to be pulled through the soil as the implement 10 moves across the field in the direction of travel 14. It should be appreciated that the implement 10 may include any suitable number of harrows 44. In fact, some embodiments of the implement 10 may not include any harrows 44.

Moreover, in one embodiment, the implement 10 may optionally include one or more baskets or rotary firming wheels 48. As is generally understood, the baskets 48 may be configured to reduce the number of clods in the soil and/or firm the soil over which the implement 10 travels. As shown, each basket 48 may be configured to be pivotally coupled to one of the harrows 44. Alternately, the baskets 48 may be configured to be pivotally coupled to the frame 20 or any other suitable location of the implement 10. It should be appreciated that the implement 10 may include any suitable number of baskets 48. In fact, some embodiments of the implement 10 may not include any baskets 48.

Figure 2:
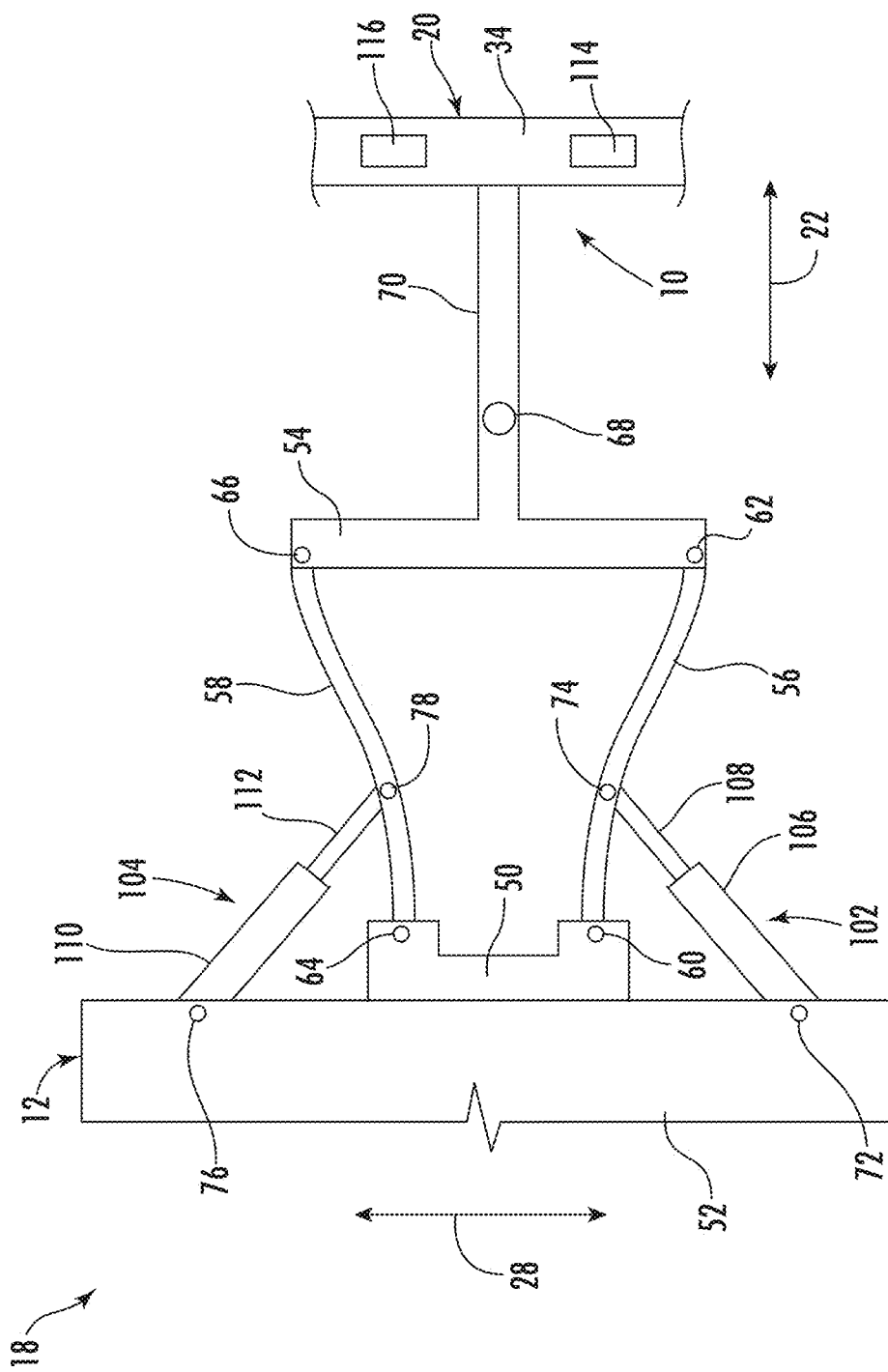
FIG. 2 illustrates a top view of one embodiment of a hitch assembly suitable for coupling an implement to a work vehicle in accordance with aspects of the present subject matter.

Referring now to FIG. 2, a top view of one embodiment of a hitch assembly 18 suitable for use with the work vehicle shown in FIG. 1 is illustrated in accordance with aspects of the present subject matter. In several embodiments, the hitch assembly 18 may include a fixed hitch frame 50 coupled to the work vehicle 12, such as to a chassis or frame 52 of the work vehicle 12. The hitch assembly 18 may also include a draw bar 54 that is moveably coupled to the hitch frame 50 by first and second links 56, 58. For example, in one embodiment, the first link 56 may be pivotably coupled to the hitch frame 50 at pivot joint 60, while an opposed end of the first link 56 may be pivotably coupled to the draw bar 54 at pivot joint 62. Similarly, the second link 58 may be pivotably coupled to the hitch frame 50 at pivot joint 64, while an opposed end of the second link 58 may be pivotably coupled to the draw bar 54 at pivot joint 66. As such, the pivot joints 60, 62, 64, 66 may permit the draw bar 54 to move relative to the hitch frame 50 in the lateral direction 28. Furthermore, as shown, the draw bar 54 may include a draw point 68 configured to be coupled to the implement 10. For example, in one embodiment, the draw point 68 may be coupled to a tow bar 70 of the implement 10, with the tow bar 70, in turn, be coupled to the implement frame 20. However, it should be appreciated that, in alternative embodiments, the draw point 68 of the hitch assembly 18 may be moveably coupled to the hitch frame 50 and/or the work vehicle frame 52 in any other suitable manner. Furthermore, it should be appreciated that the hitch assembly 18 may be an integral part of the vehicle 12 or a bolt-on assembly.

Moreover, the work vehicle 12 may include first and second actuators 102, 104 configured to move the draw point 68 relative to the hitch frame 50. As shown, in several embodiments, a cylinder 106 of the first actuator 102 may be pivotably coupled to the work vehicle frame 52 at pivot joint 72, while a rod 108 of the first actuator 102 may be pivotably coupled to the first link 56 at pivot joint 74. Similarly, a cylinder 110 of the second actuator 104 may be pivotably coupled to the work vehicle frame 52 at pivot joint 76, while a rod 112 of the second actuator 104 may be pivotably coupled to the second link 56 at pivot joint 78. As will be described below, the rods 108, 112 of the actuators 102, 104 may be configured to extend and/or retract relative to the cylinder 106, 110 of the associated actuator 102, 104 to move the draw bar 54 and the associated draw point 68 relative to the hitch frame 50, which, in turn, adjusts the orientation of the implement 10 relative to the work vehicle 12. In the illustrated embodiment, the actuators 102, 104 correspond to fluid-driven actuators, such as hydraulic or pneumatic cylinders. However, it should be appreciated that the actuators 102, 104 may correspond to any other suitable type of actuator, such as electric linear actuators. Furthermore, it should be appreciated that the work vehicle 12 may include any other suitable number of actuators configured to adjust the position of the draw point 68 relative to the hitch frame 50, such as a single actuator or three or more actuators. Additionally, in one embodiment, the actuators 102, 104 may be coupled to or otherwise positioned on the implement 10.

In accordance with aspects of the present disclosure, the implement 10 may include one or more sensors 114 configured to detect an operational parameter indicative of the operation of the implement 10. In several embodiments, the operational parameter detected by the one or more sensors 114 may be indicative of the orientation of the implement 10 relative to the vehicle 12. For example, in one embodiment, such orientation may be a direction of travel of the implement 10 relative to the vehicle 12. In such embodiment, the one or more sensors 114 may be configured to detect a location of the implement 10 within the field. In such embodiment, the one or more sensors 114 may include a location sensor, such as a GPS receiver. In other embodiments, the one or more sensors 114 may be configured to detect crop rows within the field or other features within the field, such as ridges, headlands, and/or other geographical or crop features. In such embodiments, the one or more sensors 114 may include a non-contact based sensor, such as a LIDAR sensor, a RADAR sensor, an ultrasonic sensor, an image capture device (e.g., an RGB, NIR-RGB, or CIR camera), and/or the like. Alternatively, in such embodiments, the one or more sensors 114 may include a suitable contact based sensor, such as potentiometric sensor, a load sensor, a torque sensor, or a strain gauge. However, it should be appreciated that, in alternative embodiments, the one or more sensors 114 may include any other suitable type of sensor and/or the one or more sensors 114 may be configured to detect any other suitable operational parameter of the implement 10.

Additionally, in one embodiment, the implement 10 may include an orientation sensor 116 configured to detect a pitch, a roll, and/or a yaw of the implement frame 20. More specifically, the pitch of the frame 20 may be a differential in the heights of the forward and aft ends 24, 26 of the frame 20 in the longitudinal direction 22 of the implement 10. That is, the frame 20 may be pitched when the one of the forward or aft ends 24, 26 of the frame 20 is closer to the ground than the other of forward or aft ends 24, 26 of the frame 20. Additionally, the roll of the frame 20 may be a differential in the heights of the first and second sides 30, 32 of frame 20 in the lateral direction 28 of the implement 10. That is, the frame 20 may be rolled when the one of the first and second sides 30, 32 of the frame 20 is closer to the ground than the other of first and second sides 30, 32 of the frame 20. Furthermore, the yaw of the frame 20 may be a differential in the distances of the first and second sides 30, 32 of frame 20 from the vehicle 12. That is, the frame 20 may be yawed when the one of the first and second sides 30, 32 of the frame 20 is closer to the vehicle 12 than the other of first and second sides 30, 32 of the frame 20. In one embodiment, the orientation sensor 116 may correspond to a gyroscope. However, it should be appreciated that the orientation sensor 116 may correspond to any other suitable type of orientation sensor, such as any suitable inertial measurement unit (IMU).

It should be appreciated that the configuration of the implement 10, the work vehicle 12, and the hitch assembly 18 described above and shown in FIGS. 1 and 2 is provided only to place the present subject matter in an exemplary field of use. Thus, it should be appreciated that the present subject matter may be readily adaptable to any manner of implement, work vehicle, and/or hitch assembly configurations.

Figure 3:
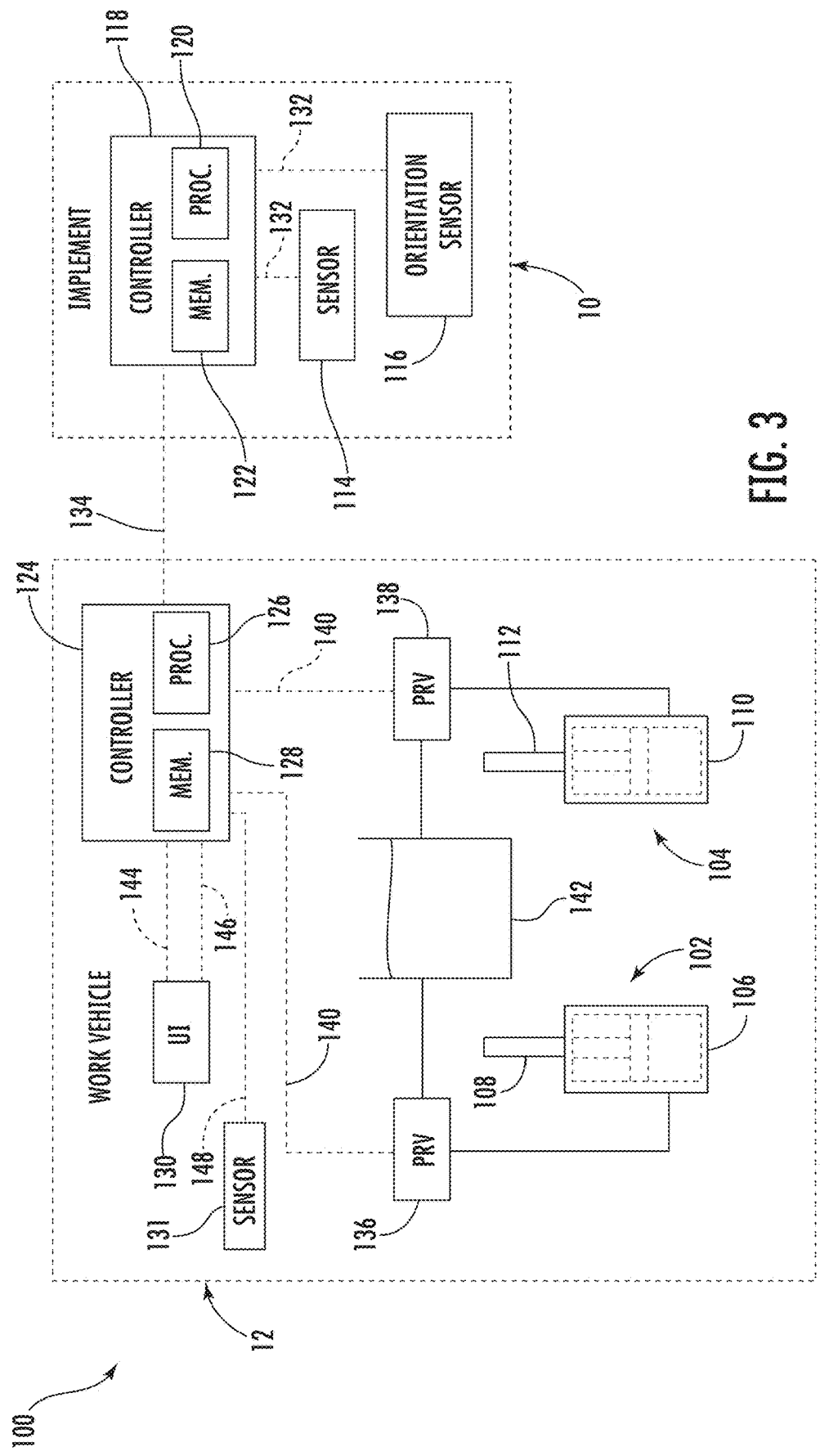
FIG. 3 illustrates a schematic view of one embodiment of a system for controlling the operation of an agricultural implement being towed by a work vehicle in accordance with aspects of the present subject matter.

Referring now to FIG. 3, a schematic view of one embodiment of a system 100 for controlling the operation of an agricultural implement is illustrated in accordance with aspects of the present subject matter. In general, the system 100 will be described herein with reference to the implement 10, the work vehicle 12, and the hitch assembly 18 described above with reference to FIGS. 1 and 2. However, it should be appreciated by those of ordinary skill in the art that the disclosed system 100 may generally be utilized with implements having any other suitable implement configuration, work vehicles having any other suitable work vehicle configuration, and/or hitch assemblies having any other suitable hitch assembly configuration.

As shown in FIG. 3, the system 100 may include one or more implement-based controllers 118 positioned on and/or within or otherwise associated with the implement 10. In general, the one or more implement controllers 118 may comprise any suitable processor-based device known in the art, such as a computing device or any suitable combination of computing devices. Thus, in several embodiments, the one or more controllers 118 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 122 of the one or more controllers 118 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 122 may generally be configured to store suitable computer-readable instructions that, when implemented by the processor(s) 120, configure the one or more implement controllers 118 to perform various computer-implemented functions, such as one or more aspects of the method 200 described below with reference to FIG. 4. In addition, the one or more implement controllers 118 may also include various other suitable components, such as a communications circuit or module, one or more input/output channels, a data/control bus and/or the like.

It should be appreciated that the one or more implement controllers 118 may correspond to an existing controller of the implement 10, itself, or the one or more controllers 118 may correspond to a separate processing device. For instance, in one embodiment, the one or more implement controllers 118 may form all or part of a separate plug-in module that may be installed in association with the implement 10 to allow for the disclosed systems and methods to be implemented without requiring additional software to be uploaded onto existing control devices of the implement 10. It should also be appreciated that the functions of the one or more implement controllers 118 may be performed by a single processor-based device or may be distributed across any number of processor-based devices, in which instance such devices may be considered to form part of the one or more implement controllers 118.

Moreover, the system 100 may include one or more work vehicle-based controllers 124 positioned on and/or within or otherwise associated with the work vehicle 12. In general, the one or more vehicle controllers 124 may comprise any suitable processor-based device known in the art, such as a computing device or any suitable combination of computing devices. Thus, in several embodiments, the one or more controllers 124 may include one or more processor(s) 126 and associated memory device(s) 128 configured to perform a variety of computer-implemented functions. Such memory device(s) 128 may generally be configured to store suitable computer-readable instructions that, when implemented by the processor(s) 126, configure the one or more vehicle controllers 124 to perform various computer-implemented functions, such as one or more aspects of the method 200 described below with reference to FIG. 4. In addition, the one or more vehicle controllers 124 may also include various other suitable components, such as a communications circuit or module, one or more input/output channels, a data/control bus and/or the like.

It should be appreciated that the one or more vehicle controllers 124 may correspond to an existing controller of the work vehicle 12, itself, or the one or more controllers 124 may correspond to a separate processing device. For instance, in one embodiment, the one or more vehicle controllers 124 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the one or more vehicle controllers 124 may be performed by a single processor-based device or may be distributed across any number of processor-based devices, in which instance such devices may be considered to form part of the one or more vehicle controllers 124. For instance, the functions of the one or more vehicle controllers 124 may be distributed across multiple application-specific controllers, such as an electro-hydraulic remote (EHR) valve controller, a navigation controller, and/or the like.

Furthermore, in one embodiment, the system 100 may also include a user interface 130 of the work vehicle 12. More specifically, the user interface 130 may be configured to receive an input from an operator of the work vehicle 12, such as an input associated with the position of the draw point 68 (FIG. 2) relative to the hitch frame 50 (FIG. 2). As such, the user interface 130 may include one or more input devices (not shown), such as touchscreens, keypads, touchpads, knobs, buttons, sliders, switches, mice, microphones, and/or the like, which are configured to receive user inputs from the operator. In addition, some embodiments of the user interface 130 may include one or more feedback devices (not shown), such as display screens, speakers, warning lights, and/or the like, which are configured to communicate feedback, such as feedback from the controllers 118, 124, to the operator of the work vehicle 12. However, in alternative embodiments, the user interface 130 may have any suitable configuration.

Additionally, the system 100 may include a vehicle-based sensor 131 configured to detect a parameter indicative of a change in the operational state of the implement 10. In several embodiments, the parameter detected by the sensor 131 may be indicative of when the implement 10 initiates and/or ceases the performance of field operations. In general, field operations may correspond to tillage, seeding, fertilizing, spraying, and/or any other agricultural operation performed on the field by the implement to prepare for or otherwise facilitate the growing of crops. In this regard, field operations may cease when the implement 10 is present within a headlands, reversing its direction of travel (e.g., at the end of a row), or when the tillage, seeding, fertilizing, spraying, and/or other agricultural operation(s) have been halted or suspended. Additionally, field operations may cease when the vehicle operator manually engages the operation of one or more of the actuators 102, 104 (e.g., via direct control of the EHR switches). For example, in one embodiment, the sensor 131 may be configured to detect a location of the implement 10 within the field, such as when the implement 10 is positioned within a headlands or at the end of a row. In such embodiment, the sensor 131 may correspond to a location sensor, such as a GPS receiver. In other embodiments, the sensor 131 may be configured to detect the steering angle of the work vehicle 12. In such embodiments, the sensor 131 may correspond to a potentiometer. However, it should be appreciated that, in alternative embodiments, the sensor 131 may correspond to any other suitable type of sensor and/or the sensor 131 may be configured to detect any other suitable parameter indicative of when the operational state of the implement has changed.

In several embodiments, the one or more implement controllers 118 may be configured to monitor an operational parameter(s) associated with the operation of the implement 10 based on sensor data received from the one or more implement-based sensors 114. Specifically, the one or more implement controllers 118 may be communicatively coupled to the one or more sensors 114 via a wired or wireless connection to allow sensor data (e.g., indicated by dashed lines 132 in FIG. 3) to be transmitted from the one or more sensors 114 to the one or more controllers 118. The one or more implement controllers 118 may then be configured determine or estimate the operational parameter based on the sensor data 132 received from the one or more sensors 114. For instance, the one or more implement controllers 118 may include a look-up table, suitable mathematical formula, and/or algorithms stored within its memory 122 that correlates the sensor data 132 to the operational parameter.

As indicated above, the operational parameter monitored by the one or more implement controllers 118 may be indicative of the orientation of the implement 10 relative to the vehicle 12, such as the direction of travel of the implement 10, the location of the implement 10 within the field, or the orientation of the implement 10 relative to features within the field (e.g., crop rows of soil ridges). For example, in one embodiment, the parameter may be an angle defined between the orientation of the implement 10 and an orientation of the crop rows within the field.

Moreover, in one embodiment, the one or more implement controllers 118 may be configured to monitor the pitch, the roll, and/or the yaw of the implement 10 detected by the orientation sensor 116. Specifically, the one or more controllers 118 may be communicatively coupled to the orientation sensor 116 via a wired or wireless connection to allow the sensor data 132 to be transmitted from the orientation sensor 116 to the one or more controllers 118. The one or more implement controllers 118 may then be configured determine or estimate the pitch, the roll, and/or the yaw of the implement 10 based on the sensor data 132 received from the orientation sensor 116. For instance, the one or more controllers 118 may include a look-up table or suitable mathematical formula stored within its memory 122 that correlates the sensor data 132 to the pitch, the roll, and/or the yaw of the implement 10.

Furthermore, in one embodiment, the one or more implement controllers 118 may be configured to compare the monitored operational parameter to one or more desired operational parameter ranges. For instance, the one or more implement controllers 118 may be configured to compare the values associated with the monitored parameter to a predetermined operational parameter range defined for the implement 10. Thereafter, in the event that the monitored operational parameter exceeds a maximum operational parameter threshold for the given operational parameter range or falls below a minimum operational parameter threshold for such range (thereby indicating that the operational parameter of the implement 10 may be too high or too low), the one or more implement controllers 118 may be configured to initiate control of the operation of the actuators 102, 104 on the work vehicle 12 to adjust the relative position of the draw point 68 of the vehicle's hitch assembly in a manner that adjusts or varies the monitored operational parameter of the implement 10.

As indicated above, in several embodiments, the operational parameter may be indicative of the orientation of the implement 10 relative to the vehicle 12, such as an angle defined between the direction of travel of the implement 10 and a direction of the crop rows within the field. In such embodiments, the one or more controllers 118 may be configured to compare the monitored direction of travel of the implement 10 to a target direction of travel of the implement 10 in order to determine a differential defined therebetween. Thereafter, in the event that the determined travel direction differential exceeds an associated predetermined differential threshold (thereby indicating that the difference between the monitored direction of travel and the target direction of travel may be too great), the one or more implement controllers 118 may be configured to initiate control of the operation of the actuators 102, 104 on the work vehicle 12 to adjust or regulate the direction of travel of the implement 10. For example, the one or more controllers 118 may be configured to initiate control of the actuators 102, 104 to move the draw point 68 of the hitch assembly 18 relative to the hitch frame 50 along the lateral direction 28. Such movement may, in turn, adjust the position of the implement 10 relative to the work vehicle 12, thereby regulating the direction of travel of the implement 10.

In several embodiments, the one or more implement controllers 118 may be configured to request the one or more vehicle controllers 124 to control the operation of the actuators 102, 104 on the work vehicle 12. Specifically, as shown in FIG. 3, the one or more implement controllers 118 may be communicatively coupled to the one or more vehicle controllers 124 via a wired or wireless connection to allow request signals (e.g., indicated by dashed lines 134 in FIG. 3) to be transmitted from the one or more implement controllers 118 to the one or more vehicle controllers 124. For example, in one embodiment, the request signals 134 may be transmitted from the one or more implement controllers 118 to the one or more vehicle controllers 124 via ISOBUS Class 3 (ISO 11783-9) communications protocols. However, in alternative embodiments, the request signals 134 may be transmitted via suitable CAN bus communications protocols or any other suitable communications protocols. Upon receipt of the request signals 134, the one or more vehicle controllers 124 may be configured to determine whether to control the operation of the actuators 102, 104 in the manner requested by the one or more implement controllers 118. For example, in one embodiment, when the implement 10 is performing a field operation (e.g., tillage operation) while being towed across the field, the one or more vehicle controllers 124 may be configured to control the operation of the actuators 102, 104 in the manner requested by the one or more implement controllers 118. Conversely, as will be described below, when the performance of field operations by the implement 10 has ceased, such as when the vehicle 12 is headlands (e.g., turning around at the end of a row), the one or more vehicle controllers 124 may be configured to ignore the requests from the one or more implement controllers 118. It should be appreciated that, in alternative embodiments, the one or more implement controllers 118 may be configured to directly control operation of the actuators 102, 104. Furthermore, the one or more implement sensors 118 may be configured to transmit the sensor data 132 (e.g., either raw data or processed data) to the one or more vehicle controllers 124. In such instances, the one or more vehicle controllers 124 may be configured to control the actuators 102, 104 based on such data 132. Once the field operations are resumed, such as when the vehicle 12 has exited the headlands (e.g., upon completion of a turn at the start of a new row), the one or more vehicle controllers 124 may be configured to control the operation of the actuators 102, 104 in the manner requested by the one or more implement controllers 118.

In accordance with aspects of the present disclosure, the one or more vehicle controllers 124 may be configured to control the operation of the actuators 102, 104 by actively controlling the operation of associated valves 136, 138, such as pressure regulating valves (PRVs), of the work vehicle 12. For instance, in the illustrated embodiment, the one or more controllers 124 is communicatively coupled to the valves 136, 138 to allow control signals (e.g., indicated by dashed lines 140 in FIG. 3) to be transmitted from the one or more controllers 124 to the valves 136, 138. In this regard, the one or more controllers 124 may be configured to control the operation of the valves 136, 138 in a manner that regulates the pressure of the hydraulic fluid supplied to the associated actuator 102, 104 from a reservoir 142 of the work vehicle 12. In such an embodiment, the pressure of the fluid supplied from the valve 136 may be directly proportional to the amount of extension/retraction of the actuator 102, thereby allowing the one or more controllers 124 to control the displacement of the actuator 102. Similarly, the pressure of the fluid supplied from the valve 138 may be directly proportional to the amount of extension/retraction of the actuator 104, thereby allowing the one or more controllers 124 to control the displacement of the actuator 104. In one embodiment, the valves 136, 138 may be incorporated into an EHR valve block. It should be appreciated that, in alternate embodiments, the one or more controllers 124 may be configured to be coupled to any other suitable component(s) for automatically controlling the operation of the actuators 102, 104.

In one embodiment, the control of the actuators 102, 104 may also be based on the monitored pitch, the roll, and/or the yaw of the implement 10. For example, in certain instances, a large roll value for the implement 10 may indicate that the implement 10 is being towed across a steep incline. In such instances, gravity may cause the implement 10 to slide down the incline, thereby resulting in the monitored orientation of the implement 10 deviating from the target orientation for the implement 10. As such, when a large roll value is present, the one or more implement controllers 118 may be configured to initiate control of the actuators 102, 104 (e.g., via the one or more vehicle controllers 124) such that a larger adjustment of the position of the implement 10 relative to the work vehicle 12 is effectuated than would be necessary on a level surface. Such an overcorrection may be used to counteract the effects of gravity.

As indicated above, in one embodiment, the system 100 may include a user interface 130. In such an embodiment, the one or more vehicle controllers 124 may be communicatively coupled to the user interface 130 via a wired or wireless connection to allow user input signals (e.g., indicated by dashed line 144 in FIG. 3) to be transmitted from the user interface 130 to the one or more controllers 124. In this regard, the one or more vehicle controllers 124 may be configured to receive various instructions from the operator of the work vehicle 12. For example, the operator may provide a new or updated target orientation and/or direction of travel for the implement 10 to the system 100 via the user interface 130. Upon receipt of the associated user input signal(s) 144, the one or more controllers 124 may be configured to control the operation of the actuators 102, 104 to adjust the orientation and/or direction of travel of the implement 10 such that the implement 10 is traveling in the new or updated orientation/travel direction. Additionally, the operator may be provide manual adjustments to the system 100 via the user interface 130, such as manually adjusting the position of the draw point 68 of the hitch assembly 18 relative to the hitch frame 50. In such instances, upon receipt of the associated user input signals 144, the one or more vehicle controllers 124 may be configured to control the operation of the actuators 102, 104 to effectuate the manual adjustment. It should be appreciated that, in alternative embodiments, the user interface 130 may be communicatively coupled directly to the one or more implement controllers 118 such that the one or more controllers 118 controls the actuators 102, 104 in accordance with the user input signals 144.

Furthermore, the communicative coupling provided between the one or more vehicle controllers 124 and the user interface 130 may also allow feedback signals (e.g., indicated by dashed line 146 in FIG. 3) to be transmitted from the one or more controllers 124 to the user interface 130. For example, the one or more controllers 124 may be configured to transmit a notification to the operator (e.g., by causing a visual or audible notification or indicator to be presented to the operator within the work vehicle 12) providing an indication of the monitored orientation of the implement 10 relative to a target orientation. For example, the notification may provide an indication of the monitored direction of travel of the implement 10 relative to the target direction of travel. Upon receipt of the associated feedback signals 146, the user interface 130 may be configured to present the notification to the operator. It should be appreciated that, in alternative embodiments, the user interface 130 may be communicatively coupled directly to the one or more implement controllers 118 such that the one or more controllers 118 transmits the feedback signals 116 to the user interface 130.

Additionally, in one embodiment, the one or more vehicle controllers 124 may be configured to transmit a notification to the operator of the work vehicle 12 when the actuators 102, 104 are unable to provide the desired change in orientation and/or direction of travel of the implement 10. For instance, the actuators 102, 104 may not be able to effectuate the desired change of direction, such as when the implement 10 is on a steep slope (e.g., as determined by the detected pitch of the implement 10), the work vehicle 12 is not traveling on the target path (e.g., as detected by a location sensor (not shown) of the work vehicle 12), and/or the actuators 102, 104 or associated hydraulic components have malfunctioned. Specifically, upon receipt of the request signals 134 from the one or more implement controllers 118 or the user input signals 144 from the user interface 130, the one or more vehicle controllers 124 may be configured to determine if the actuators 102, 104 are capable of effectuating the desired change in the direction of travel of the implement 10, such as by referencing a look-up table or suitable mathematical formula stored within its memory. In the event the actuators 102, 104 are unable to effectuate the desired change in direction, the one or more controllers 124 may be configured to transmit a notification to the operator (e.g., by causing a visual or audible notification or indicator to be presented to the operator within the work vehicle 12) indicating the same. It should be appreciated that the one or more implement controllers 118 may, instead, be configured to directly transmit a notification to the operator via the user interface 130 when the actuators 102, 104 are unable to provide the desired change in direction of travel of the implement 10.

Additionally, as indicated above, the one or more vehicle controllers 124 may be configured to determine when the operational state of the implement 10 has changed, such as when the performance of field operations has ceased or resumed. Specifically, the one or more vehicle controllers 124 may be communicatively coupled to the vehicle sensor 131 via a wired or wireless connection to allow data (e.g., indicated by dashed line 148 in FIG. 3) to be transmitted from the vehicle sensor 131 to the one or more vehicle controllers 124. In general, the data 148 may be indicative of a change in the operational state of the implement 10. For example, in embodiments in which sensor 131 correspond to a location sensor, the sensor 131, the one or more vehicle controllers 124 may be configured to determine the position of the vehicle 12 within the field based on the data 148. For example, the one or more vehicle controllers 124 may be configured to compare this determined location to a map stored within its memory 128 to determine the location of the vehicle 12 within the field. When the one or more vehicle controllers 124 determines that the vehicle 12 is proximate to and/or within a headlands, the one or more vehicle controllers 124 may be configured to determine that the implement 10 has ceased performance of field operations. However, it should be appreciated that, in alternative embodiments, the one or more vehicle controllers 124 may be configured to when the implement's operational state has changed based on any other suitable data, such as steering angle data.

In one embodiment, when the operational state is changing, the one or more vehicle controllers 124 may be configured to control the operation of the valves 136, 138. Specifically, in such instances, the one or more vehicle controllers 124 may be configured to ignore the request signals 134 received from the one or more implement controllers 118. In this respect, the one or more vehicle controllers 124 may be configured to control the operation of the valves 136, 138 such that the actuators 102, 104 adjust the orientation of the implement 10 relative to the vehicle 12 in a manner that facilitate vehicle's operation when the implement 10 has ceased performing field operations. For example, when the vehicle 12 is turning around in a headlands, such the actuators 102, 104 may steer the implement 10 relative to the vehicle 12, thereby reducing the turning radius of the combination of the vehicle 12 and implement 10.

Figure 4:
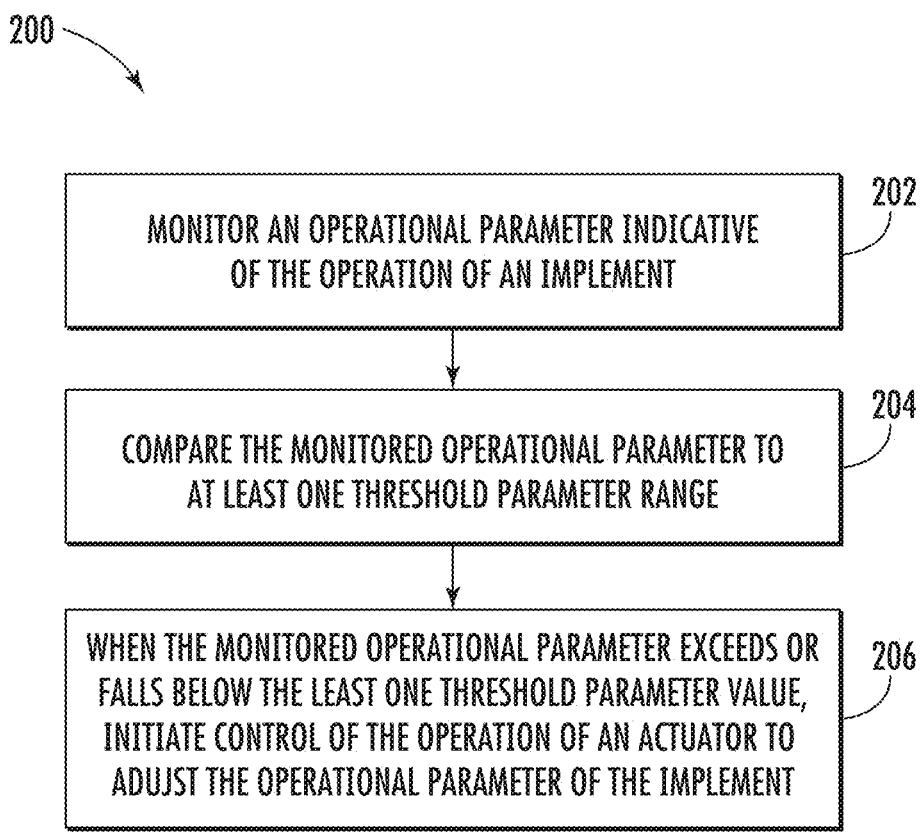
FIG. 4 illustrates a flow diagram of one embodiment of a method for controlling the operation of an agricultural implement being towed by a work vehicle in accordance with aspects of the present subject matter.

Referring now to FIG. 4, a flow diagram of one embodiment of a method 200 for controlling the operation of an agricultural implement being towed by a work vehicle is illustrated in accordance with aspects of the present subject matter. In general, the method 200 will be described herein with reference to the implement 10, the work vehicle 12 and the system 100 described above with reference to FIGS. 1-3. However, it should be appreciated by those of ordinary skill in the art that the disclosed method 200 may generally be utilized to control the operation of an agricultural implement being towed by a work vehicle for any agricultural implement having any suitable implement configuration, work vehicles having any other suitable vehicle configuration, hitch assemblies having any other suitable assembly configuration, and/or systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include monitoring, with a computing device installed on an implement, an operational parameter indicative of the operation of the implement. For instance, as described above, the one or more implement controllers 118 may be communicatively coupled to the one or more sensors 114 configured to monitor a given operational parameter(s) of the implement 10, such as orientation of the implement 10 relative to the vehicle 12 or the direction of travel of the implement 10. As such, sensor data 132 transmitted from the one or more sensors 114 may be received by the one or more implement controllers 118 for monitoring the associated operational parameter(s).

Additionally, at (204), the method 200 may include comparing, with the computing device, the monitored operational parameter to at least one threshold parameter value. For instance, as described above, the one or more implement controllers 118 may be configured to compare the monitored operational parameter(s) to at least one threshold parameter value, such as a maximum parameter threshold and/or a minimum parameter threshold. Assuming the monitored operational parameter(s) has exceeded the maximum operational parameter threshold or fallen below the minimum operational parameter threshold, the one or more implement controllers 118 may determine that the operational parameter should be adjusted.

Moreover, as shown in FIG. 4, at (206), when the monitored operational parameter exceeds or falls below the threshold parameter value(s), the method 200 may include initiating, with the computing device, control of the operation of an actuator associated with a hitch assembly of the work vehicle to adjust the operational parameter of the implement. For instance, as described above, the one or more implement controllers 118 may be configured to transmit request signals 134 to the one or more vehicle controllers 124 requesting the one or more vehicle controllers 124 to control the operation of the actuators 102, 104 (e.g., via the valves 136, 138) to regulate the operational parameter of the implement 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling an operation of agricultural implements, the system comprising:
   a work vehicle including a hitch assembly including a hitch frame and a draw point moveable relative to the hitch frame, the work vehicle further including an actuator configured to move the draw point relative to the hitch frame, the work vehicle further including a vehicle-based sensor and a vehicle-based controller communicatively coupled to the vehicle-based sensor; and
   an implement configured to be towed by the work vehicle, the implement configured to be coupled to the draw point such that movement of the draw point relative to the hitch frame adjusts the position of the implement relative to the work vehicle, the implement including an implement-based sensor configured to detect an operational parameter indicative of the operation of the implement, the implement further including an implement-based controller communicatively coupled to the implement-based sensor, the implement-based controller configured to receive the sensor data from the implement-based sensor and transmit signals to the vehicle-based controller requesting the vehicle-based controller to control an operation of the actuator based on sensor data received from the implement-based sensor to adjust the operational parameter of the implement,
   wherein the vehicle-based controller is configured to determine when the implement is present within a headlands based on the sensor data received from the vehicle-based sensor and ignore the signals received from the implement-based controller requesting that the vehicle-based controller adjust the operation of the actuator when it is determined that the implement is present within the headlands; and wherein the vehicle-based controller is further configured to operate the actuator such that the draw point is moved relative to the hitch frame so as to reduce a turning radius of the work vehicle and implement when it is determined that the implement is present within the headlands and the vehicle-based controller is ignoring the signals received from the implement-based controller.

2. The system of claim 1, wherein the operational parameter is indicative of an orientation of the implement, the implement-based controller being configured to transmit the signals to the vehicle-based controller requesting the vehicle-based controller to control the operation of the actuator based on the sensor data received from the implement-based sensor to regulate the orientation of the implement.

3. The system of claim 2, wherein the implement-based controller is further configured to monitor the operational parameter relative to a predetermined parameter range and transmit the signals to the vehicle-based controller requesting the vehicle-based controller to control the operation of the actuator to adjust the orientation of the implement when the operational parameter exceeds a predetermined maximum parameter value of the predetermined parameter range or falls below a predetermined minimum parameter value of the predetermined parameter range.

4. The system of claim 3, wherein the implement-based controller is further configured to initiate notification of an operator of the implement when it is determined that the actuator is unable to adjust the orientation of the implement in a manner such that the operational parameter is returned to a value within the predetermined parameter range.

5. The system of claim 3, wherein the implement-based controller is further configured to initiate presentation of an indication of the orientation of the implement relative to a target orientation of the implement.

6. The system of claim 1, wherein the vehicle-based controller is further configured to control the operation of the actuator to adjust the position of the implement relative to the work vehicle based on a user input signal.

7. The system of claim 1, further comprising:
an orientation sensor configured to detect at least one of a pitch, a roll, or a yaw of the implement, the implement-based controller being configured to transmit the signals to the vehicle-based controller requesting the vehicle-based controller to control the operation of the actuator based on the at least one of the pitch or the roll to regulate the operation of the implement.

8. The system of claim 1, wherein the implement-based sensor corresponds to a non-contact based sensor.

9. The system of claim 8, wherein the non-contact based sensor corresponds to at least one of a location sensor, an image capture device, a LIDAR sensor, or an ultrasonic sensor.

10. A method for controlling an operation of an agricultural implement being towed by a work vehicle, the work vehicle comprising a hitch assembly including a hitch frame and a draw point moveable relative to the hitch frame, the draw point configured to be coupled to the implement, the work vehicle further comprising an actuator configured to move the draw point relative to the hitch frame to adjust the position of the implement relative to the work vehicle, the method comprising:

monitoring, with a computing device installed on the implement, an operational parameter indicative of the operation of the implement;

comparing, with the computing device, the operational parameter to at least one threshold parameter value; and when the operational parameter exceeds or falls below the least one threshold parameter value, transmitting, with the computing device, signals to a vehicle-based controller installed on the work vehicle requesting the vehicle-based controller to control of an operation of the actuator to adjust the operational parameter of the implement, the vehicle-based controller being configured to determine when the implement is present within a headlands and ignore the signals requesting that the vehicle-based controller adjust the operation of the actuator when it is determined that the implement is present within the headlands; and wherein the vehicle-based controller is further configured to operate the actuator such that the draw point is moved relative to the hitch frame so as to reduce a turning radius of the work vehicle and implement when it is determined that the implement is present within the headlands and the vehicle-based controller is ignoring the signals received from the implement-based controller.

11. The method of claim 10, wherein the operational parameter is indicative of an orientation of the implement, the method further comprising:
transmitting, with the computing device, signals to the vehicle-based controller requesting the vehicle-based controller to control the operation of the actuator based on the operational parameter to regulate the orientation of the implement.

12. The method of claim 11, further comprising:
initiating, with the computing device, presentation of an indication of the orientation of the implement relative to a target orientation of the implement.

13. The method of claim 10, further comprising:
initiating, with the computing device, notification of an operator of the implement when it is determined that the actuator is unable to adjust the orientation of the implement in a manner such that the operational parameter is returned to a value within a predetermined parameter range.

14. The method of claim 10, further comprising:
transmitting, with the computing device, signals to the vehicle-based controller requesting the vehicle-based controller to control the operation of the actuator to adjust the position of the implement relative to the work vehicle based on a user input signal.

15. The method of claim 10, further comprising:
receiving, with the computing device, an input indicative of a change in a target orientation of the implement; and
transmitting, with the computing device, signals to the vehicle-based requesting the vehicle-based controller to control the operation of the actuator to adjust the position of the implement relative to the work vehicle based on the change in the target orientation.

16. The method of claim 10, further comprising:
transmitting, with the computing device, signals to the vehicle-based controller requesting the vehicle-based controller to control the operation of the actuator based on at least one of a pitch, a roll, or a yaw of the implement.

* * * * *